(12) United States Patent
Wang et al.

(10) Patent No.: US 8,160,043 B2
(45) Date of Patent: Apr. 17, 2012

(54) BASEBAND CHIP AND METHOD TO IMPLEMENT MULTI-MODE SWITCHING FOR MOBILE TERMINAL BASED ON BASEBAND CHIP

(75) Inventors: Dongyan Wang, Beijing (CN); Shihe Li, Beijing (CN); Hua E, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 1016 days.

(21) Appl. No.: 11/996,180

(22) PCT Filed: Jul. 19, 2006

(86) PCT No.: PCT/CN2006/001748
§ 371 (c)(1),
(2), (4) Date: May 6, 2008

(87) PCT Pub. No.: WO2007/009380
PCT Pub. Date: Jan. 25, 2007

(65) Prior Publication Data
US 2008/0205366 A1    Aug. 28, 2008

(30) Foreign Application Priority Data

Jul. 20, 2005    (CN) .......................... 2005 1 0085099

(51) Int. Cl.
*H04B 7/216*    (2006.01)
*H04J 1/00*    (2006.01)
(52) U.S. Cl. .................. 370/342; 370/343; 370/335
(58) Field of Classification Search .................. 370/342, 370/343, 335
See application file for complete search history.

(56) References Cited

U.S. PATENT DOCUMENTS

| 5,535,432 | A | 7/1996 | Dent | |
|---|---|---|---|---|
| 2001/0001617 | A1* | 5/2001 | Koga et al. | 375/347 |
| 2003/0079152 | A1* | 4/2003 | Triece | 713/322 |
| 2004/0166825 | A1* | 8/2004 | Huang et al. | 455/313 |
| 2004/0198237 | A1* | 10/2004 | Abutaleb et al. | 455/78 |
| 2005/0031097 | A1* | 2/2005 | Rabenko et al. | 379/93.31 |
| 2005/0266846 | A1* | 12/2005 | Kim | 455/436 |

FOREIGN PATENT DOCUMENTS

| CN | 1622670 A | 8/2004 |
|---|---|---|
| JP | 10-505981 | 6/1998 |
| JP | 2005-167417 | 6/2005 |
| WO | WO 00/68783 | 11/2000 |

* cited by examiner

*Primary Examiner* — Jeffrey Pwu
*Assistant Examiner* — Shripal Khajuria
(74) *Attorney, Agent, or Firm* — Stephen A. Bent; Foley & Lardner LLP

(57) ABSTRACT

The present invention discloses a baseband chip and a method to implement multi-mode switching for a mobile terminal based on the baseband chip, the baseband chip of the mobile terminal in the present invention includes three subsystems of a source encoding/decoding subsystem 102, a wireless transmitting/receiving subsystem 101, a wireless transmitting/receiving and source encoding/decoding common control and process subsystem 100, the baseband chip may be implemented by using a single chip based on CMOS technology. The baseband chip of the present invention are suitably used to a TD-SCDMA mode mobile terminal or a multi-mode mobile terminal including TD-SCDMA, the new requirements proposed to the mobile terminal of the third generation mobile communication technology are met, and repeated design are decreased; furthermore, the method of switching among different communication modes for the mobile terminal based on the above mentioned baseband chip in the present invention implements the switching among different communication modes for the mobile terminal.

27 Claims, 2 Drawing Sheets

BASEBAND CHIP AND METHOD TO IMPLEMENT MULTI-MODE SWITCHING FOR MOBILE TERMINAL BASED ON BASEBAND CHIP

FIELD OF THE INVENTION

The present invention relates to a mobile terminal chip technology, especially to a method which is complied with protocols such as Time Division-Synchronous Code Division Multiple Access (TD-SCDMA) and the like of the 3rd Generation Partnership Project (3GPP), is suitably used for the baseband chip of TD-SCDMA mode mobile terminal or a multi-mode mobile terminal including TD-SCDMA mode, and is used to switch the mobile terminal based on the baseband chip of the present invention among different communication modes.

BACKGROUND

It is well-known that the key of industrialization of TD-SCDMA is terminal, while the bottleneck of terminal is the research for the terminal chip scheme. The chip design for the second generation mobile terminal is mostly prone to use solidified application-specific hardware circuits, while software is only used to implement a little part of chip design. It takes three to five years from an initial chip design to a commercial application of the chip, and the chip design using solidified application-specific hardware circuits is hard to meet the new changed requirements.

TD-SCDMA is one of the 3rd mobile communication system standards formally accepted by the International Telecommunication Union (ITU), new requirements are proposed to the mobile terminal based on the 3rd generation mobile communication technology, which are shown on the following aspects:

More plentiful applications; supporting multi-mode, saving user cost, having the capability of providing more flexible service, and being favorable to the carrier to use spectrum resources more reasonable; lower cost; providing customized services, and easily updating the system.

In order to meet new requirements and face new challenges, a more optimized system architecture must be adopted at the key technology step of the mobile terminal design, namely, the chip design, so that the chip design is suitable to more mobile terminals to decrease the cost of repeated design.

Until now, there is no commercialized application-specific baseband chip suitable to a multi-mode terminal including TD-SCDMA mode. The application-specific baseband chip performs the mode selection through a main control unit of the system, receives IQ data from Radio Frequency (RF), implements the baseband processing of the corresponding mode, and transmits data to be transmitted after the baseband processing by the system via an RF channel.

SUMMARY OF THE INVENTION

As discussed above, the main object of the present invention is to provide a baseband chip suitably used to a TD-SCDMA mode mobile terminal or a multi-mode mobile terminal including TD-SCDMA mode. The baseband chip of the mobile terminal may meet new requirements proposed for the mobile terminals of the 3rd generation mobile communication technology, and the cost of repeated design is decreased.

In order to achieve the above mentioned object, the present invention provides a baseband chip including an interface module 100A, a source encoding/decoding subsystem 102, a wireless transmitting/receiving subsystem 101 and a common control and process subsystem 100 connected with each other via the interface module 100A, wherein the source encoding/decoding subsystem 102, to receive source data from source data interfaces, convert data protocol and specified rate data of the source data to a format supported by the current communication mode of the baseband chip, send the converted data to the wireless transmitting/receiving subsystem 101 via the interface module 100A, convert the data format of data from the wireless transmitting/receiving subsystem 102 to a data format received by a data source, and send the converted data to the source date interfaces;

the wireless transmitting/receiving subsystem 101, to implement encoding/decoding, modulating/demodulating and burst forming of data and signaling under control of the common control and process subsystem 100 via the interface module 100A, transmit wireless signaling and data after up-converted by a RF module via an air interface, receive wireless signaling and data to be down-converted by the RF module, and provide dedicated and common transmission channels to data or voice services; and the common control and process subsystem 100, to implement timing control of the wireless transmitting/receiving subsystem 101 and the air interface, and implement control processes among subsystems of the baseband chip.

In the above mentioned baseband chip, the source encoding/decoding subsystem 102 includes:

an interface driving module 1021 and a data encoding/decoding module 1020, to implement communication with a data interface 107 in the source data interfaces, send data from the data interface 107 to the interface module 100A after encoding, and send data from the interface module 100A to the data interface 107 after decoding; and a vocoder module 1022, to implement communication with an voice interface 108 in the source data interfaces, send voice data from the voice interface 108 to the interface module 100A after encoding, and send voice data from the interface module 100A to the voice interface 108 after decoding.

In the above mentioned baseband chip, the source encoding/decoding subsystem 102 further includes: a video high speed analog-to-digital converting ADC/digital-to-analog converting DAC module 1024 and a video encoding/decoding module 1023, to implement communication with a video sensor interface 109 in the source data interfaces, send data from the video sensor interface 109 to the wireless transmitting/receiving subsystem 101 via the interface module 100A after ADC and encoding, and send data from the wireless transmitting/receiving subsystem 101 to the video sensor interface 109 after DAC and decoding.

In the above mentioned baseband chip, the vocoder module 1022 includes:

a local clock generating circuit, to generate clock required to implement PCM encoding;

a G.711 pulse modulation PCM codec, to implement conversion from analog voice to digital voice in combination with the clock;

a variable gain, to adjust voice volume; and a digital-to-analog converting circuit, to implement data sampling of the digital voice.

In the above mentioned baseband chip, the data interface 107 is at least one of an RS-232 interface, a USB OTG interface, an interface complied with IEEE802.11, an interface complied with IEEE802.3 and a PCMCIA interface.

In the above mentioned baseband chip, the wireless transmitting/receiving subsystem 101 includes:

a system timing control and RF control unit 1010, to control the RF module via the air interface, wherein a mode control register is set in the system timing control and RF control unit 1010 and the common control and process subsystem 100 controls the mode control register to implement the switching among multi-mode systems;

a transmitting filter module 1011 and a receiving filter module 1015, to implement forming filtering to an IQ signal, wherein the transmitting filter module 1011 is connected with TX_I/Q of the air interface and the receiving filter module 1015 is connected with RX_I/Q of the air interface;

a burst forming module 1012, to generate bursts complied with TD-SCDMA to implement beam forming of bursts to be transmitted;

a multi-user detection module 1016, to demodulate data and detect data of each user;

an interleaving module 1013 and a de-interleaving module 1017, to interleave data to be transmitted and de-interleave received data after demodulation respectively; and a channel encoding and multiplexing module 1014 and a channel decoding and de-multiplexing module 1018, to decrease errors in data transmission channel, wherein the channel decoding and de-multiplexing module 1018 implements operations of channel decoding and de-multiplexing on IQ data from a receiving channels and the channel encoding and multiplexing module 1014 implements operations of channel encoding and multiplexing information on IQ data from transmitting channels.

In the above mentioned baseband chip, the wireless transmitting/receiving subsystem 101 further includes: an encrypting/decrypting accelerator module 1019, to implement operations of encrypting/decrypting and encrypt/decrypt data transmitted/received via the interface module 100A under the control of the common control and process subsystem 100.

In the above mentioned baseband chip, a mode set register is set in the encrypting/decrypting accelerator module 1019, to set different communication modes, according to which different encrypting operations are implemented.

In the above mentioned baseband chip, the transmitting filter module 1011 and the receiving filter module 1015 are a transmitting root raised cosine RRC filter and a receiving RRC filter respectively.

In the above mentioned baseband chip, the receiving/sending RRC filters are accelerators with the coefficients reconfigurable.

In the above mentioned baseband chip, the bursts complied with TD-SCDMA protocol are downlink pilot DWPTS, uplink pilot UPPTS, or common bursts.

In the above mentioned baseband chip, a multi-user detection accelerator is set in the multi-user detection module 1016.

In the above mentioned baseband chip, the user detection accelerator is a general accelerator.

In the above mentioned baseband chip, an interleaving accelerator and a de-interleaving accelerator are set in the interleaving module 1013 and the de-interleaving module 1017 respectively, to implement channel encoding/decoding together with the channel encoding and multiplexing module 1014/the channel decoding and de-multiplexing module 1018.

In the above mentioned baseband chip, the channel decoding and de-multiplexing module 1018 includes Viterbi and Turbo decoding accelerator to implement decoding; and the channel encoding and multiplexing module 1014 is used to add information redundancy to data according to protocol requirements for different communication modes.

In the above mentioned baseband chip, plural channel encoding and multiplexing modules 1014 encode data in a cascade way.

In the above mentioned baseband chip, the dedicated transmission channels and the common transmission channels provided by the wireless transmitting/receiving subsystem 101 include: dedicated transmission channel DCH, broadcasting channel BCH, control information paging channel PCH, and forward access channel FACH.

In the above mentioned baseband chip, the dedicated transmission channels and the common transmission channels provided by the wireless transmitting/receiving subsystem 101 further include uplink shared channel USCH and downlink shared channel DSCH.

In the above mentioned baseband chip, the dedicated transmission channels and the common transmission channels provided by the wireless transmitting/receiving subsystem 101 further include paging indicator channel PICH and forward physical access channel FRACH.

In the above mentioned baseband chip, the common control and process subsystem 100 includes:

at least one digital signal processor DSP module 1001 and a DSP memory (1002) for storing DSP program and data;

at least one Micro-controller MCU module 1003 and an MCU memory 1004 for storing MCU program and data, wherein a system state machine is set in the MCU module 1003 to detect whether the system has requirements for system mode switching in real time and data exchanges between the DSP module 1001 and the MCU module 1003 are implemented by using a standard bus or a shared memory;

a power and clock management module 1005, to manage power and clock of the mobile terminal by a battery charging circuit interface 102 and a real time clock circuit interface 103;

a keyboard and display driving module 1006 and a SIM or USIM control module 100B connected with a SIM or USIM circuit 10A, to support a monochromatic display module and a color display module and support a standard keyboard module and an extendable keyboard module;

a system monitoring module 1007, to collect monitoring data from the interface 104;

a peripheral serial interface module 1008, to download data and update or debug software; and an external bus interface module 1009, to connect with and support external memories.

In the above mentioned baseband chip, the peripheral serial interface module (1008) is a dedicated serial interface of the MCU.

In the above mentioned baseband chip, the external memories connected with and supported by the external bus interface module 1009 include a data memory RAM, a program memory ROM, an Erasable Programmable Read Only Memory EPROM, and a Electrically Erasable Programmable Read Only Memory E2PROM.

In the above mentioned baseband chip, the external bus interface module 1009 further includes a decompressor to decompress data stored in the external memories.

In the above mentioned baseband chip, the baseband chip is integrated in a single chip.

In order to achieve above mentioned object better, the present invention also provides a method of implementing multi-mode switching for a mobile terminal based on a baseband chip, wherein the baseband chip includes a source encoding/decoding subsystem 102, a wireless transmitting/receiving subsystem 101, a common control and process subsystem 100 and an interface module 100A, and a communication mode is preset after the mobile terminal is power on, said method includes the following steps:

A. according to the set communication mode, the baseband chip configures the wireless transmitting/receiving subsystem 101, so that each module therein works in a currently selected communication mode;

B. the mobile terminal works in the current communication mode, and determines whether there is a requirement for communication mode switching or not, if yes, the process enters to step C; otherwise, the process returns to step B; and C. according to the communication mode to be switched, the baseband chip resets the communication mode and returns to step A after the mobile terminal is soft reset.

In the above mentioned method, the communication mode is set in a mode control register of the system timing control and RF control unit 1010 in the wireless transmitting/receiving subsystem 101.

In the above mentioned method, the way to determine whether there is the requirement for the communization mode switching or not in step B is: a system state machine of the MCU module 1003 in the baseband chip detects and determines whether there is the requirement for the communication mode switching or not, if the state in the system state machine indicates that the communication mode is changed, then there is the requirement for the communication mode switching; otherwise, there is not the requirement for the communication mode switching.

From the above mentioned technology scheme, the baseband chip of the mobile terminal according to the present invention includes three subsystems of a source encoding/decoding subsystem 102, a wireless transmitting/receiving subsystem 101, a wireless transmitting/receiving and source encoding/decoding common control and process subsystem 100, the connection among the three subsystems is implemented by an interface module 100A of the wireless transmitting/receiving subsystem and the source encoding/decoding subsystem. The baseband chip may be implemented by using a single chip based on CMOS technology. The baseband chip of the present invention are suitably used to a TD-SCDMA mode mobile terminal or a multi-mode mobile terminal including TD-SCDMA, the new requirements proposed to the mobile terminal of the third generation mobile communication technology are met, and repeated design are decreased; furthermore, the method of switching among different communication modes for the mobile terminal based on the above mentioned baseband chip in the present invention implements the switching among different communication modes for the mobile terminal.

DETAILED DESCRIPTION OF THE INVENTION

A main idea of the present invention is to integrate a source encoding/decoding subsystem 102, a wireless transmitting/receiving subsystem 101 and a common control and process subsystem 100 for wireless transmitting/receiving and source encoding/decoding, which constitute a baseband chip, to a single silicon chip. The baseband chip is suitably used for a baseband chip of a TD-SCDMA mode mobile terminal or a multi-mode mobile terminal including TD-SCDMA mode, and meets the new requirements proposed to the mobile terminals of the 3rd generation mobile communication technology, which decreases the cost for repeated design. Furthermore, the method of switching the mobile terminal based on the above mentioned baseband chip of the present invention among different communication modes implements switching of the mobile terminal among different communication modes.

In order to make the objective, the technique scheme and the advantages of the present invention clearer, the present invention is further described in detail with preferable embodiment referring to accompanying drawings.

With the digital signal processing (DSP) technology with a high processing capability and a low power cost growing up gradually, the chip design technology of a mobile terminal based on software radio shows its advantages gradually, the present invention designs a more optimized chip architecture based on software radio technology, and constructs a design platform of a mobile terminal to meet the continuously changed requirements from customers, and supports the design of multi-mode terminal. The present invention solves the design problems of multi-mode terminal chip including TD-SCDMA mode based on the above mentioned terminal chip design.

Figure 1:
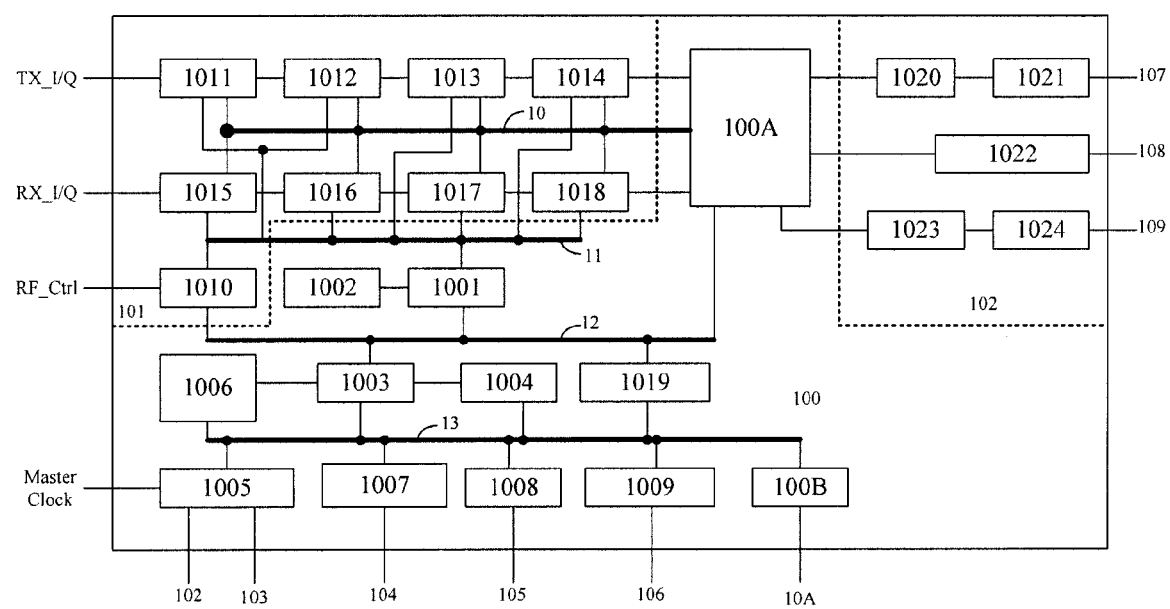
FIG. 1 is a schematic diagram showing an architecture of a baseband chip of a mobile terminal according to the present invention.

FIG. 1 is a schematic diagram showing an architecture of a baseband chip of a mobile terminal according to the present invention. As shown in FIG. 1, the baseband chip of the mobile terminal according to the present invention mainly includes a source encoding/decoding subsystem 102, a wireless transmitting/receiving subsystem 101, a common control and process subsystem for wireless transmitting/receiving and source encoding/decoding 100, and an interface module 100A, hereinafter, the common control and process subsystem for wireless transmitting/receiving and source encoding/decoding 100 is referred as the common control and process subsystem 100 for short. The interface module 100A is used to connect among the three subsystems, the baseband chip according to the present invention is implemented in a single chip based on CMOS technology, and the baseband units are integrated in the single chip.

Wherein the source encoding/decoding subsystem 102 is used to receive source data from source data interfaces, convert the data protocol and the specified rate data of the source data to the format supported by the current communication mode of the baseband chip, and send the converted data to the wireless transmitting/receiving subsystem 101 via the interface module 100A, on the other hand, to convert the format of data from the wireless transmitting/receiving subsystem 102 to the format of data received by the source data terminal, and then send the converted data to the source date interfaces.

The wireless transmitting/receiving subsystem 101 is used to perform encoding/decoding, modulating/demodulating, and burst forming on data and signaling, transmit the wireless signaling and data after up-converted by the RF module via the air interface and receive the wireless signaling and data to be converted by the RF module via the air interface. The wireless transmitting/receiving subsystem 101 is controlled by the common control and process subsystem 100 via a control bus 10 and the interface module 100A. Meanwhile, the wireless transmitting/receiving subsystem 101 provides dedicated and common transmission channels for various data or voice services.

The common control and process module 100 is used to implement the timing control of the wireless transmitting/receiving subsystem 101 and the air interface, and implement the control process among subsystems of the baseband chip.

The functions and components of respective subsystems will be described in detail as following:

1) Source Encoding/Decoding Subsystem 102

The source encoding/decoding subsystem 102 is mainly responsible to convert the data protocol and the specific rate data of the source data to the format supported by TD-SCDMA or other communication modes, send packaged data to the wireless transmitting/receiving subsystem 101 via the interface module 100A, and meanwhile, to convert the format of data from the wireless transmitting/receiving subsystem 102 to the data format received by the source data terminal, and then send the data to the source data interfaces, the source data here may be a personal computer (PC), PDA, FAX, a positioning/navigation system, an electric map, POTS, ISDM Cable Modem, a wireless data terminal and the like.

The source encoding/decoding subsystem 102 includes:

an interface driving module 1021 and a data encoding/decoding module 1020 communicated with a data interface 107, to implement communication with the data interface 107 in the source data interfaces, send data from the data interface (107) to the interface module 100A after encoding, and send data from the interface module 100A to the data interface 107 after decoding, wherein the data interface may be RS-232, USB OTG, IEEE802.11, IEEE802.3, or PCMCIA and the like; and a voice interface 108 including a vocoder module 1022 communicated with an earphone and a speaker, to implement communication with an voice interface 108 in the source data interfaces, send voice data from the voice interface 108 to the interface module 100A after encoding, and sent voice data from the interface module 100A to the voice interface 108 after decoding.

The vocoder module 1022 may include various voice codec, such as audio/modem raiser (AMR) voice codec complied with 3GPP TS26.xxx standard and the like; and the data source codec module 1020 may support broadband AMR voice processing function complied with 3GPP TR26.901 and the like.

The vocoder module 1022 may also include a Pulse Code Modulation (PCM) codec, a local clock generation circuit, a variable gain and a digital-to-anolog/analog-to-digital conversion circuit complied with G.711 specification, to control the gain of a voice signal. G.711 PCM codec implements the conversion from analog voice to digital voice, a clock circuit of the local clock generation circuit generates clock needed to implement PCM coding, the variable gain is used to adjust voice volume, and the DA converting circuit is used to implement data sampling to the digital voice.

The vocoder module 1022 may also include an echo cancellation circuit, which is helpful to improve voice quality of a vehicle hand-free telephone, for example.

Wherein the source encoding/decoding subsystem 102 may also include a video high speed analog-to-digital conversion (ADC) and digital-to-analog conversion (DAC) module 1024 and a video encoding/decoding module 1023 communicated with a video sensor interface 109, to implement communication with the video sensor interface 109 in the source data interfaces, i.e., to send data from the video sensor interface 109 to the wireless transmitting/receiving subsystem 101 after ADC and encoding and send data from the wireless transmitting/receiving subsystem 101 to the video sensor interface 109 after DAC and decoding.

The data interface 107, the voice interface 108 and the video interface 109 are unified called as the source interfaces.

2) Wireless Transmitting/Receiving Subsystem 101

The wireless transmitting/receiving subsystem 101 is mainly responsible to implement encoding/decoding, modulating/demodulating, and burst forming of data and signaling, transmit the wireless signaling and data after up-converted by the RF module via the air interface and receive the wireless signaling and data to be down-converted by the RF module via the air interface. Each module of the wireless transmitting/receiving subsystem 101 is connected with each other via a control bus 10 of the wireless transmitting/receiving subsystem 101, and controlled by the common control and process subsystem 100 via the control bus 10 and the interface module 100A, therefore, the multi-mode system and systems configured for specific requirements may be supported more flexibly.

The wireless transmitting/receiving system 101 includes:

(1) an system timing control and RF control unit 1010 with a mode control register set therein, wherein the switching among multi-mode systems is implemented through the configuration of the mode control register by the common control and process subsystem 100 and the system timing control and RF control unit 1010 is connected with RF_ctrl signal from the air interface;

(2) a transmitting filter module 1011 and a receiving filter module 1015, to implement the forming filtering to an IQ signal, wherein the transmitting filter module 1011 is connected with TX_I/Q from the air interface and the receiving filter module 1015 is connected with RX_I/Q from the air interface;

wherein the transmitting filter module 1011 and the receiving filter module 1015 may select a transmitting Root Raised Cosine (RRC) filter and a receiving RRC filter respectively, to implement forming of pulses, and the transmitting/receiving RRC filter may be designed to be a hardware accelerator module with reconfigurable coefficients in order to meet the performance requirements for adjacent channel response and the like in different channel modes;

(3) a burst forming module 1012, to generate bursts complied with TD-SCDMA protocol, such as downlink pilots DWPTS, uplink pilots UPPTS and common bursts and the like, to implement the beam forming of bursts to be transmitted;

(4) a multi-user detection module 1016, to implement demodulation of data and detection of data for each user;

wherein a user detection accelerator may be selectively set in the multi-user detection module 1016 and may be designed as a general accelerator;

(5) an interleaving module 1013 and a de-interleaving module 1017, wherein the interleaving module 1013 is used to interleave data to be transmitted and the de-interleaving module 1017 is used to de-interleave received data after demodulation;

wherein an interleaving hardware accelerator and a de-interleaving hardware accelerator may be selectively set in the interleaving module 1013 and the de-interleaving module 1017 respectively, to implement the channel encoding/decoding function together with a channel encoding and multiplexing module 1014 and a channel decoding and de-multiplexing module 1018 respectively; and (6) the channel encoding and multiplexing module 1014 and the channel decoding and de-multiplexing module 1018, wherein channel encoding refers to encoding each information symbol in order to decrease data transmission errors in a complex wireless channel environment and decoding is the reverse processing of encoding;

wherein the channel encoding and multiplexing module 1014 is used to decrease errors in a data transmission channel, the channel decoding and de-multiplexing module 1018 performs operations of channel decoding and de-multiplexing on IQ data from the receiving channel and the channel encoding and multiplexing module 1014 performs operations of channel encoding and information multiplexing on IQ data from the transmitting channel.

The channel decoding and de-multiplexing module 1018 may select an accelerator including Viterbi and Turbo decoding; and the channel encoding and multiplexing module 1014 may add redundant information to the data according to the protocol requirements of different modes, so that the errors in data transmitted through a wireless channel may be detected and corrected. The channel encoding and multiplexing module 1014 may be more than one; each channel encoding and multiplexing module 1014 may encode data in a cascade way to achieve a relative good encoding performance, and the convolution coding and second-order Reed-muler coding may be adopted in 3GPP TD-SCDMA mode.

Taking the TD-SCDMA system as an example, according to 3GPP 25.222 protocol, the channel encoding and multiplexing module 1014 and the channel decoding and de-multiplexing module 1018 mainly include the following encoding, decoding, multiplexing, and de-multiplexing process respectively.

The encoding and multiplexing process includes: CRC check encoding, transmission block cascade and code block segmentation, channel convolution coding, wireless frame equalization, first interleaving, wireless frame segmentation, rate matching, transmission channel multiplexing, bit scrambling, second interleaving, sub-frame segmentation, physical channel mapping, TFCI (transport format combination indicator) coding and the like.

The decoding and de-multiplexing process includes: TFCI decoding, TFI (transport format indicator) calculation, physical channel de-mapping, sub-frame merging, second de-interleaving, bit de-scrambling, transmission channel de-multiplexing, rate de-matching, wireless frame cascade, first de-interleaving, frame length recovery, Viterbi/Turbo decoding, code block cascade and transmission block segmentation, CRC check and the like.

According to the composition of the above mentioned wireless transmitting/receiving subsystem 101, IQ data from the receiving path of the air interface are forming filtered by the receiving filter module 1015, the forming filtered data are demodulated and detected by the multi-user detection module 1016, the demodulated data are de-interleaved by a de-interleaving module 1017 and the channel decoding and de-multiplexing process are implemented by the channel decoding and de-multiplexing module 1018. Then the IQ data processed by the wireless transmitting/receiving subsystem 101 are sent to the source encoding/decoding subsystem 102 via the interface module 100A under the control of the common control and process module 100.

The source data to be sent from the source encoding/decoding subsystem 102 are sent to the channel encoding and multiplexing module 1014 via the interface module 100A under the control of the common control and process module 100, after the channel encoding and multiplexing process, the data to be sent are interleaved by the interleaving module 1013, and bursts complied with TD-SCDMA protocol are generated by the burst forming module 1012, so that the beaming forming of transmitting bursts is implemented, and then the data are sent to the transmitting path of the air interface after forming filtering by the transmitting filter module 1011.

Otherwise, the wireless transmitting/receiving subsystem 101 may further include an encrypting/decrypting accelerator module 1019 to implement operations of encrypting/decrypting, different encrypting operations are implemented according to different modes in the mode control register.

As the standardization establishment organization of 3G system, 3GPP already makes a rule for secure access standard of the prophase application of 3G system to guarantee the maximum compatibility with GSM secure access mechanism. Algorithms of protection for confidentiality and integrity of information, as well as algorithms of authentication and key agreement for user authentication, are prescribed in the secure access standard.

There are two standardization algorithms defined in the standard, f8 and f9. F8 algorithm is used to provide encrypting protection to information, called confidentiality algorithm, which is used to protect transmission information from revealing and wiretapping; f9 algorithm is used to provide integrity protection to information, called integrity algorithm, which is used to protect the transmission information from any destroying. Any revising, adding, deleting or any other destroying operations to the transmission information may be detected. The identification bits of the identification algorithm in the standard may be represented by four bits. Besides the specified standardization algorithms f8 and f9, other algorithms are allowed to be used by considering some special factors, for example, the encrypting/decrypting algorithms are mainly implemented in Remote Resource Control (RRC) layer, Remote Link Control (RLC) layer and Media Access (MAC) layer in TD-SCDMA mode, therefore, the encrypting/decrypting accelerator module 1019 may selectively connect with MCU, on which part of software of RRC layer, RLC layer and MAC layer are bore, so that data stream of the system are fluent and the encrypting/decrypting operation is easily implemented, meanwhile the real time requirement of the system may be met.

For multi-mode systems supporting such as GSM mode, the encrypting/decrypting algorithm accelerator complied with GSM standard may be configured to connect with the DSP module 1001, otherwise, the mode setting register of the encrypting/decrypting accelerator module 1019 may be differently set according to different modes.

The wireless transmitting/receiving subsystem 101 provides the use of dedicated channels and common channels at the same time.

For example, suitable dedicated channels include Dedicated Channel (DCH), which may be used for the uplink/downlink to carry user information or control information between the network and given UEs;

Suitable control channels include: Broadcast Channel (BCH), used for dedicated information in a broadcast system and a cell; Paging Channel (PCH), used to send control information to a mobile station when the system does not know the cell where the mobile station locates; and Forward Access Channel (FACH), used to send control information to the mobile station when the system knows the cell where the mobile station locates, wherein FACH may also carry some short user information packages.

The present invention may also selectively support two channels of Uplink Shared Channel (USCH) and Downlink Shared Channel (DSCH). USCH is an uplink transmission channel shared by several UEs and is used to carry dedicated control data or service data; and DSCH is a downlink transmission channel shared by several UEs and is used to carry dedicated control data or service data.

The present invention also supports the decoding process of two special physical channels of Paging Indicator Channel (PICH) and Forward Physical Access Channel (FRACH).

3) Common Control and Process Subsystem 100

The main functions of the common control and process subsystem 100 include: on one hand in charge of the timing control of the wireless transmitting/receiving subsystem 101 and the air interface; and on the other hand, in charge of the processing of all software and hardware interruption, message and non-real-time operations among modules of the subsystems in the baseband chip.

The common control and process subsystem 100 includes:

(1) a Digital Signal Processing (DSP) module 1001 and a DSP memory 1002 which is used to store DSP program and data, wherein one or more DSP modules may be adopted according to actual situation; and (2) a Micro-Controller (MCU) module 1003 and a MCU memory 1004 which is used to store MCU program and data, wherein a system state machine is set in the MCU module 1003 to detect whether the system has a requirement for switching system modes in real time, and one or more MCU modules may be selectively adapted according to actual situations.

The data exchange between the DSP module 1001 and the MCU module 1003 may be implemented with a communication way such as a standard bus or a shared memory. The DSP module 1001 and the MCU module 1003 may adopt a real time operation system. The DSP module 1001 and the MCU module 1003 are connect with the system timing control and RF control unit 1010 in wireless transmitting/receiving subsystem 101 via a DSP and MCU to the source encoding/decoding subsystem interface bus 12, the DSP module 1001 and the MCU module 1003 may configure a mode control register in the system timing control and RF control unit 1010, and control information configured in the mode control register are further sent to other modules in the wireless transmitting/receiving subsystem 101 via a DSP bus 11 and the control bus 10 in the wireless transmitting/receiving subsystem 101, so that the mode control of a multi-mode system is implemented. Wherein, the system timing control and RF control unit 1010 may implement the system real time timing control under the control of the DSP module 1001 and the MCU module 1003.

When the channel decoding and de-multiplexing module 1018 includes a Viterbi and Turbo decoding accelerator, the DSP module 1001 may connect with the Viterbi and Turbo decoding accelerator to implement data encoding/decoding operation complied with 3GPP regulations.

When a multi-user detection accelerator is designed in the multi-user detection module 1016, the DSP module 1001 may connect with the multi-user detection accelerator, and may selectively add Rake accelerator and the like to support multi-mode design.

When an interleaving accelerator and a de-interleaving accelerator are designed in the interleaving module 1013 and the de-interleaving module 1017 respectively, the DSP module 1001 may connect with the interleaving accelerator and the de-interleaving accelerator respectively to implement the required channel encoding/decoding function together with the channel encoding and multiplexing module 1014 and the channel decoding and de-multiplexing module 1018.

When the transmitting filter module 1011 and the receiving filter module 1015 use the transmitting RRC filter and the receiving RRC filter respectively, the DSP module 1001 may connect with the transmitting RRC filter and the receiving RRC filter respectively to implement the function of pulse forming.

When the wireless transmitting/receiving subsystem 101 includes the encrypting/decrypting accelerator module 1019, the encrypting/decrypting accelerator module 1019 may be selectively configured to connect with the DSP module 1001 or the MCU module 1003. For instance, for the case of supporting 3GPP, the Kasumi encrypting algorithm complied with 3GPP protocol in the encrypting/decrypting accelerator module 1019 is activated, and connects with the MCU module 1003; for the case of supporting GSM mode, the Cipher encrypting algorithm complied with GSM protocol in the encrypting/decrypting accelerator module 1019 is activated, and connects with the DSP module 1003; and a specified encrypting algorithm supporting customization may be configured for other dedicated applications.

Otherwise, a code decompression circuit may be included in both the DSP module 1001 and the MCU module 1003 to support plural applications and a large storage amount, and the bottleneck between code density and processor speed is thus solved.

(3) A power and clock management module 1005, which manages the power and clock of a mobile terminal via a battery charging circuit interface 102 and a real time clock circuit interface 103.

The power and clock management module 1005 connects with Master Clock of the RF module to implement the TD-SCDMA system clock recovered by the RF receiving unit of the mobile terminal, implement the frequency lock of the system clock by an RF local oscillator circuit of the power and clock management module 1005, and the module may include a phase-locked loop circuit, a clock synthesizing circuit and the like. When the system is in a sleep mode, the main clock of the system is shut off, and a RTC circuit that supports the maintenance of the system frame number provides a clock. Generally, a power management circuit will shut off the power of unused functional modules in a chip under the management of functional modules such as MCU and the like according to the current state of the mobile terminal. In the present invention, an external real time clock that is powered by individual batteries is adopted to provide functions required by the system such as calendar and the like. The power and clock management module 1005 also includes a battery charging/discharging control circuit.

(4) A keyboard and display driving module 1006 and a SIM or USIM control module 100B connected with a SIM or USIM circuit 10A, which are used to support a monochromatic display module and a color display module and support a standard keyboard and an extendable keyboard module.

(5) A system monitoring module 1007, used to collect monitoring data of a temperature sensor and the like connected via an interface 104.

(6) A peripheral serial interface module 1008, used to download data, and update or debug software. For instance, a protocol stack analyzer 105 of TD-SCDMA may connect with the mobile terminal via the peripheral serial interface module 1008, so that the simulation may be implemented under various testings such as testing for protocol stack conformity and the like. The peripheral serial interface may be the dedicated serial interface for MCU chip.

(7) An external bus interface module 1009, used to connect and support various external memories such as RAM, ROM, EPROM, and E2PROM and the like. Otherwise, the external bus interface module 1009 may selectively add the function of decompression for data stored in external memories, so that the MCU may not decompress code and thus run code faster.

The common control and process module 100 includes the DSP bus 11, the DSP and MCU to the source encoding/decoding subsystem interface bus 12, and a MCU bus 13, those buses connect each module of the common control and process module 100 together.

Wherein, the DSP bus 11 is used to implement the communication between each sub-module or each accelerator in the wireless transmitting/receiving subsystem and DSP, the DSP and MCU to the source encoding/decoding subsystem interface bus 12 is used to implement the communications among the source encoding/decoding subsystem 102, the wireless transmitting/receiving subsystem 101, and the common control and process module 100, and the MCU bus 13 is used to implement the communication among each functional sub-module interfaced with MCU.

By adopting this kind of bus architecture, a relatively flexible design platform is provided to the design facing multi-mode and multi-application. For instance, for the multi-mode design, the main difference is about the wireless transmitting/receiving subsystem 101 except the RF difference, the wireless transmitting/receiving subsystem 101 may be reconfigured by the common control and process module 100 based on the software selection to support multi-mode design; for the case of requiring to support multi-application, the source encoding/decoding subsystem 102 may be reconfigured by the common control and process module 100 based on the software selection to support multi-application.

Figure 2:
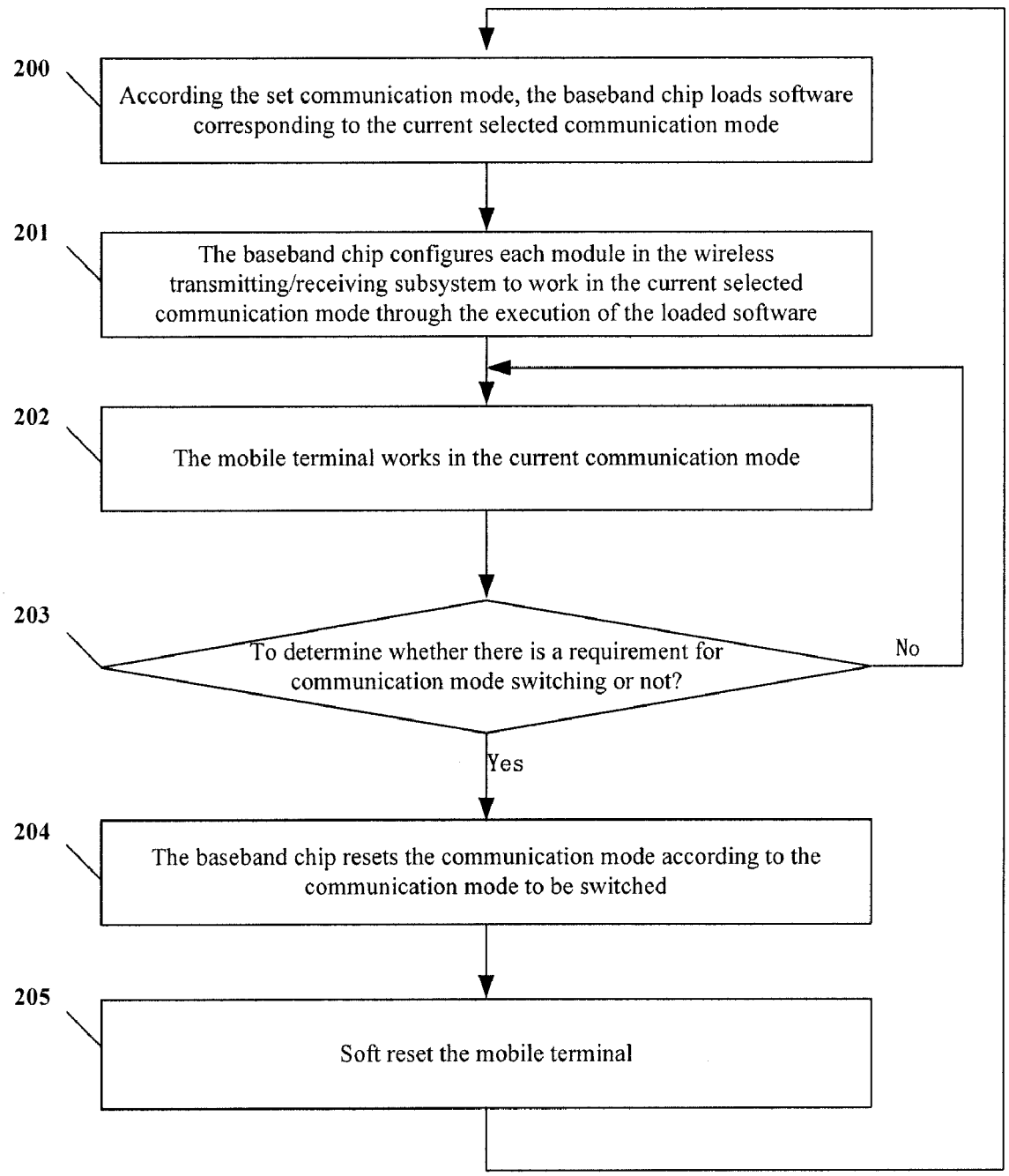
FIG. 2 is a flowchart showing a process of switching among different modes according to the present invention.

The switching process among different communication modes of the mobile terminal based on the baseband chip according to the present invention is described in detail reference to FIG. 2. FIG. 2 is a flowchart showing a process of switching among different modes according to the present invention. The default communication mode of the system is assumed to be communication mode 1, the detail steps are as following.

Step 200: After the mobile terminal is power on, the baseband chip of the mobile terminal loads the software corresponding to the current communication mode according to the user set.

The system default communication mode is preset in the mode control register of the system timing control and RF control unit 1010 of the wireless transmitting/receiving subsystem 101. Otherwise, a bootup program is preset in the program memory (ROM) of the baseband chip and used to load different software corresponding to different communication modes to ROM according to the different communication modes configured in the above mentioned mode control register.

In this step, the bootup program loads the software corresponding to the current communication mode 1 to ROM.

Step 201: The baseband chip configures each module in the wireless transmitting/receiving subsystem to work in the current communication mode through the execution of the loaded software.

The MCU module 1003 or the DSP module 1001 send the control information configured in the mode control register to other modules of the wireless transmitting/receiving subsystem 101 via the DSP bus 11 and the control bus 10 of the wireless transmitting/receiving subsystem 101.

In this step, for each module with a mode configuration register in the wireless transmitting/receiving subsystem 101, the mode configuration register, such as a mode set register in the encrypting/decrypting accelerator module 1019 is set to the current selected communication mode.

Steps 202 to 203: The mobile terminal works in the current communication mode, and determines whether there is a requirement for the communication mode switching or not, if yes, the process enters to step 204; otherwise, the process returns to step 202.

In these steps, the system state machine of the MCU module in the baseband chip detects and determines whether there is a requirement for the communication mode switching or not. If the state in the system state machine indicates that the communication mode is changed, there is a requirement for the communication mode switching; otherwise, there is not a requirement for the communication mode switching.

Steps 204 to 205: According to the communication mode to be switched, the baseband chip resets the communication mode, and the process returns to step 200 after the mobile terminal is soft reset.

In these steps, the MCU module 1003 acquires the communication mode to be switched according to the detection of the system state machine, the mode control register is reset in the system timing control and RF control unit 1010, namely, the communication mode to be switched is written to the mode control register.

The above are only preferred embodiments of the present invention and is not intended to limit the protection scope of the present invention.

The invention claimed is:

1. A baseband chip including an interface module, a source encoding/decoding subsystem, a wireless transmitting/receiving subsystem and a common control and process subsystem all connected with each other via an interface module, wherein the source encoding/decoding subsystem is configured to:
receive source data from source data interfaces,
convert data protocol and specified rate data of the source data to a format supported by the current communication mode of the baseband chip,
send the converted data to the wireless transmitting/receiving subsystem via the interface module,
convert the data format of data from the wireless transmitting/receiving subsystem to a data format received by a data source, and send the converted data to the source date interfaces;

the wireless transmitting/receiving subsystem is configured to:
implement encoding/decoding, modulating/demodulating and burst forming of data and signaling under control of the common control and process subsystem via the interface module,
transmit wireless signaling and data after up-converted by a RF module via an air interface,
receive wireless signaling and data to be down-converted by the RF module, and
provide dedicated and common transmission channels to data or voice services; and the common control and process subsystem is configured to:
implement timing control of the wireless transmitting/receiving subsystem and the air interface, and
implement control processes among subsystems of the baseband chip, wherein the source encoding/decoding subsystem, the wireless transmitting/receiving subsystem, and the common control and process subsystem are integrated into a single silicon chip.

2. The baseband chip according to claim 1, wherein the source encoding/decoding subsystem comprises:
an interface driving module and a data encoding/decoding module, configured to:
implement communication with a data interface in the source data interfaces,
send data from the data interface to the interface module after encoding, and
send data from the interface module to the data interface after decoding; and
a vocoder module, configured to:

implement communication with an voice interface in the source data interfaces,
send voice data from the voice interface to the interface module after encoding, and
send voice data from the interface module to the voice interface after decoding.

3. The baseband chip according to claim 2, wherein the source encoding/decoding subsystem further comprises:
a video high speed analog-to-digital converting ADC/digital-to-analog converting DAC module and a video encoding/decoding module, configured to:
implement communication with a video sensor interface in the source data interfaces,
send data from the video sensor interface to the wireless transmitting/receiving subsystem via the interface module after ADC and encoding, and
send data from the wireless transmitting/receiving subsystem to the video sensor interface after DAC and decoding.

4. The baseband chip according to claim 2, wherein the vocoder module comprises:
a local clock generating circuit configured to generate clock required to implement PCM encoding;
a G.711 pulse modulation PCM codec configured to implement conversion from analog voice to digital voice in combination with the clock;
a variable gain configured to adjust voice volume; and
a digital-to-analog converting circuit configured to implement data sampling of the digital voice.

5. The baseband chip according to claim 2, wherein the data interface is at least one of an RS-232 interface, a USB OTG interface, an interface complied with IEEE802.11, an interface complied with IEEE802.3 or a PCMCIA interface.

6. The baseband chip of according to claim 1, wherein the wireless transmitting/receiving subsystem comprises:
a system timing control and RF control unit configured to control the RF module via the air interface, wherein a mode control register is set in the system timing control and RF control unit and the common control and process subsystem controls the mode control register to implement the switching among multi-mode systems;
a transmitting filter module and a receiving filter module, configured to implement forming filtering to an IQ signal, wherein the transmitting filter module is connected with TX_UQ of the air interface and the receiving filter module is connected with RX_I/Q of the air interface;
a burst forming module configured to generate bursts complied with TD-SCDMA to implement beam forming of bursts to be transmitted;
a multi-user detection module configured to demodulate data and detect data of each user;
an interleaving module and a de-interleaving module configured to interleave data to be transmitted and de-interleave received data after demodulation respectively; and
a channel encoding and multiplexing module and a channel decoding and de-multiplexing module configured to decrease errors in data transmission channel, wherein the channel decoding and de-multiplexing module implements operations of channel decoding and de-multiplexing on IQ data from a receiving channels and the channel encoding and multiplexing module implements operations of channel encoding and multiplexing information on IQ data from transmitting channels.

7. The baseband chip according to claim 6, wherein the wireless transmitting/receiving subsystem further comprises:
an encrypting/decrypting accelerator module configured to implement operations of encrypting/decrypting and encrypt/decrypt data transmitted/received via the interface module under the control of the common control and process subsystem.

8. The baseband chip according to claim 7, wherein a mode set register is set in the encrypting/decrypting accelerator module and configured to set different communication modes, according to which different encrypting operations are implemented.

9. The baseband chip according to claim 6, wherein the transmitting filter module and the receiving filter module are a transmitting root raised cosine RRC filter and a receiving RRC filter respectively.

10. The baseband chip according to claim 9, wherein the transmitting RRC filter and the receiving RRC filter are accelerators with coefficient reconfigurable.

11. The baseband chip according to claim 6, wherein the bursts complied with TD-SCDMA protocol comprise at least one of downlink pilot DWPTS, uplink pilot UPPTS, or common bursts.

12. The baseband chip according to claim 6, wherein a multi-user detection accelerator is set in the multi-user detection module.

13. The baseband chip according to claim 12, wherein the user detection accelerator comprises a general accelerator.

14. The baseband chip according to claim 6, wherein an interleaving accelerator and a de-interleaving accelerator are set in the interleaving module and the de-interleaving module, respectively, to implement channel encoding/decoding together with the channel encoding and multiplexing module and the channel decoding and de-multiplexing module.

15. The baseband chip according to claim 6, wherein the channel decoding and de-multiplexing module comprises Viterbi and Turbo decoding accelerator to implement decoding; and the channel encoding and multiplexing module is used to add information redundancy to data according to protocol requirements for different communication modes.

16. The baseband chip according to claim 6, wherein plural channel encoding and multiplexing modules encode data in a cascade way.

17. The baseband chip according to claim 1, wherein the dedicated transmission channels and the common transmission channels provided by the wireless transmitting/receiving subsystem comprise: dedicated transmission channel DCH, broadcasting channel BCH, control information paging channel PCH, and forward access channel FACH.

18. The baseband chip according to claim 17, wherein the dedicated transmission channels and the common transmission channels provided by the wireless transmitting/receiving subsystem further comprise uplink shared channel USCH and downlink shared channel DSCH.

19. The baseband chip according to claim 18, wherein the dedicated transmission channels and the common transmission channels provided by the wireless transmitting/receiving subsystem further comprise paging indicator channel PICH and forward physical access channel FRACH.

20. The baseband chip according to claim 1, wherein the common control and process subsystem comprises:
at least one digital signal processor DSP module and a DSP memory for storing DSP program and data;
at least one Micro-controller MCU module and an MCU memory for storing MCU program and data, wherein a system state machine is set in the MCU module to detect whether the system has requirements for system mode switching in real time and data exchanges between the DSP module and the MCU module are implemented by using a standard bus or a shared memory;

a power and clock management module configured to manage power and clock of the mobile terminal by a battery charging circuit interface and a real time clock circuit interface;

a keyboard and display driving module and a SIM or USIM control module connected with a SIM or USIM circuit configured to support a monochromatic display module and a color display module and support a standard keyboard module and an extendable keyboard module;

a system monitoring module configured to collect monitoring data from the interface (104);

a peripheral serial interface module configured to download data and update or debug software; and an external bus interface module configured to connect with and support external memories.

21. The baseband chip according to claim 20, wherein the peripheral serial interface module is a dedicated serial interface of the MCU.

22. The baseband chip according to claim 20, wherein the external memories connected with and supported by the external bus interface module comprise at least one of a data memory RAM, a program memory ROM, an Erasable Programmable Read Only Memory EPROM, or a Electrically Erasable Programmable Read Only Memory E2PROM.

23. The baseband chip according to claim 22, wherein the external bus interface module further comprises a decompressor configured to decompress data stored in the external memories.

24. A method of implementing multi-mode switching for a mobile terminal based on a baseband chip, wherein the baseband chip comprises a source encoding/decoding subsystem, a wireless transmitting/receiving subsystem, a common control and process subsystem and an interface module, and wherein a communication mode is preset after the mobile terminal is power on, said method comprising the following steps:

A. according to the set communication mode, the baseband chip configures the wireless transmitting/receiving subsystem such that each module therein works in a currently selected communication mode;

B. the mobile terminal works in the current communication mode, and determines whether there is a requirement for communication mode switching and, if yes, the process goes to step C; otherwise, the process returns to step B; and C. according to the communication mode to be switched, the baseband chip resets the communication mode and returns to step A after the mobile terminal is soft reset, wherein the source encoding/decoding subsystem, the wireless transmitting/receiving subsystem, and the common control and process subsystem are integrated into a single silicon chip.

25. The method according to claim 24, wherein the communication mode is set in a mode control register of the system timing control and RF control unit in the wireless transmitting/receiving subsystem.

26. The method according to claim 24, wherein the step B further comprises:

a system state machine of the MCU module in the baseband chip detects and determines whether there is the requirement for the communication mode switching and, if the state in the system state machine indicates that the communication mode is changed, then there is the requirement for the communication mode switching; otherwise, there is no requirement for the communication mode switching.

27. The baseband chip according to claim 1, wherein the single silicon chip is configured as a multi-mode chip for a mobile terminal, and wherein the single silicon chip supports and is capable of switching among a plurality of modes, including TD-SCDMA mode.

* * * * *